(12) United States Patent
Ohl et al.

(10) Patent No.: US 8,215,179 B2
(45) Date of Patent: Jul. 10, 2012

(54) INTEGRATED DEVICE FOR MONITORING DEFORMATIONS OF AN ELECTRICALLY INSULATING PART AND METHOD FOR MANUFACTURING ONE SUCH DEVICE

(75) Inventors: Brigitte Ohl, Champagnier (FR); Sylvie Teyssier, Saint Ismier (FR); Joan Aymami, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 316 days.

(21) Appl. No.: 12/598,105

(22) PCT Filed: May 19, 2008

(86) PCT No.: PCT/FR2008/000690
§ 371 (c)(1),
(2), (4) Date: Oct. 29, 2009

(87) PCT Pub. No.: WO2009/004137
PCT Pub. Date: Jan. 8, 2009

(65) Prior Publication Data
US 2010/0132477 A1 Jun. 3, 2010

(30) Foreign Application Priority Data
May 29, 2007 (FR) .................................... 07 03763

(51) Int. Cl.
*G01L 1/24* (2006.01)
(52) U.S. Cl. ............................. 73/800; 73/760
(58) Field of Classification Search .................. 73/760, 73/800
See application file for complete search history.

(56) References Cited

U.S. PATENT DOCUMENTS

| | | | | |
|---|---|---|---|---|
| 6,087,655 A | * | 7/2000 | Kobrin | 250/237 G |
| 7,154,081 B1 | | 12/2006 | Friedersdorf et al. | 250/227.14 |
| 7,162,123 B2 | * | 1/2007 | Andre et al. | 385/37 |
| 7,560,203 B2 | * | 7/2009 | Tamoto et al. | 430/58.05 |
| 7,580,441 B2 | * | 8/2009 | Lee et al. | 372/92 |
| 7,995,626 B2 | * | 8/2011 | Lee et al. | 372/20 |
| 8,003,197 B2 | * | 8/2011 | Yukawa et al. | 428/195.1 |
| 2004/0206893 A1 | * | 10/2004 | Sato | 250/227.14 |

FOREIGN PATENT DOCUMENTS

| FR | 2 791 768 | 10/2000 |
|---|---|---|
| WO | WO 03/076887 | 9/2003 |

OTHER PUBLICATIONS

Fernando, Gerard F., "Fibre optic sensor systems for monitoring composite structures," Reinforced Plastics, vol. 49, No. 11, Dec. 2005, pp. 41-49.

* cited by examiner

*Primary Examiner* — Max Noori
(74) *Attorney, Agent, or Firm* — Steptoe & Johnson LLP

(57) ABSTRACT

An integrated device for monitoring an electrically insulating part, the device having an optic fiber that includes at least one Bragg grating, the electrically insulating part being a composite material with a thermosetting matrix, and the optic fiber including a polyimide mechanical protection sleeve made. The device is integrated into an electrically insulating part or an electrically insulating enclosure. The invention also includes a method for manufacturing the device including positioning in a mold part of an optic fiber that includes at least one Bragg grating, and molding of the electrically insulating part.

13 Claims, 4 Drawing Sheets

INTEGRATED DEVICE FOR MONITORING DEFORMATIONS OF AN ELECTRICALLY INSULATING PART AND METHOD FOR MANUFACTURING ONE SUCH DEVICE This application is a national stage entry of International Application No. PCT/FR2008/000690, filed May 19, 2008 designating the U.S., which claims the benefit of French Application No. 0703763, filed May 29, 2007.

BACKGROUND OF THE INVENTION

The invention relates to the field of devices for monitoring deformations of a mechanical structure.

The invention more particularly concerns an integrated device for monitoring deformations of an electrically insulating part for an electrical installation, said device comprising an optic fiber in which at least a first Bragg grating is formed.

The invention also relates to an electrically insulating part for an electrical installation formed from a composite material, such as an electrically insulating enclosure designed to accommodate electrical components.

The invention also relates to a method for manufacturing an integrated device for monitoring deformations of an electrically insulating part for an electrical installation.

STATE OF THE ART

It is known to use optic fibers comprising Bragg gratings by incorporating them in a mechanical structure in order to measure or detect deformations of this structure. The Bragg grating is generally etched on the optic fiber and presents a periodic pattern reproduced with a certain pitch enabling a wavelength characteristic of said grating to be defined. Sending an incident light signal into this optic fiber generates multiple reflections by the patterns of the Bragg grating, and in the absence of deformation of this grating, the reflected signal presents a wavelength that is substantially equal to the characteristic wave-length of the grating. Any deformation of the part of the optic fiber comprising the Bragg grating, such as an expansion or a contraction, gives rise to a variation of the wavelength of the reflected signal, which is representative of this deformation. A part of optic fiber comprising a Bragg grating can thus be inserted in a mechanical structure in order to measure, detect or monitor any deformation of this structure. One particularity of Bragg gratings etched in optic fibers is that they are very sensitive to the slightest deformations having an amplitude smaller than an angstrom.

French Patent application FR2791768 describes one such device comprising a Bragg grating to measure deformations of a structure to be monitored, as well as describing the means for integrating this device and for securing it to the structure to be monitored.

The electrically insulating parts used in electrical installations, such as enclosures or casings designed to accommodate electrical components, can be subjected to mechanical stresses. For example, these mechanical stresses can be generated by pressure variations of a quenching gas. These mechanical stresses can also be generated by plasticization of the electrically insulating material due for example to a high ambient humidity content.

The electrically insulating parts used in electrical installations can also be subjected to temperature variations, for example heat rises by the electrical components of the installation or variations of the environmental conditions.

The electrically insulating parts used in electrical installations, such as cases or recipients designed to accommodate electrical components, are generally made from a composite material with a thermosetting matrix. The material of these parts is generally sensitive to temperature variations, which can give rise to deformations leading to damage that may be detrimental to satisfactory operation of the installations. Moreover, the material of these electrically insulating parts presents a vitreous transition temperature which may, under certain conditions, be close to the operating temperature range.

One object of the present invention is therefore to monitor the deformations of these electrically insulating parts, such as cases or recipients designed to accommodate electrical components, to prevent any risk of damage detrimental to the installation. One technical problem is to implement a monitoring device using an optic fiber in a composite material with a matrix that can present a vitreous transition temperature close to the operating temperature. Another technical problem is that of integrating such a device in an electrically insulating part in the course of a molding process often accompanied by exothermal reactions.

SUMMARY OF THE INVENTION

The object of the invention is to remedy the technical problems of prior art devices by proposing an integrated device for monitoring deformations of an electrically insulating part for an electrical installation, said device comprising an optic fiber in which at least a first Bragg grating is formed.

In the monitoring device according to the invention, the electrically insulating part is made from a composite material with a thermosetting matrix, the optic fiber comprises a mechanical protection sleeve made of polyimide material, and the optic fiber is covered by a coating comprising at least one compound of the thermosetting matrix.

The coating is preferably essentially of the same composition as the thermosetting matrix of the electrically insulating part.

According to one embodiment, the thermosetting matrix comprises at least one compound chosen from epoxy, polyurethanes, phenolics and unsaturated polyesters. The thermosetting matrix preferably essentially comprises a compound chosen from epoxy, polyurethane and an unsaturated polyester.

According to a preferred embodiment, the optic fiber comprises a portion in which a second Bragg grating is formed, said portion being mechanically insulated from the electrically insulating part. The portion of fiber in which the second Bragg grating is formed is preferably covered with a layer of elastomer. The elastomer layer advantageously presents a thickness comprised between 0.05 and 0.7 times the diameter of the optic fiber.

The invention also relates to an electrically insulating part for an electrical installation formed in a composite material in which the monitoring device described above is integrated in said part.

The invention also relates to an insulating electrical enclosure, designed to receive electrical components, formed from a composite material in which the monitoring device described above is integrated in said enclosure.

The invention also relates to method for manufacturing an integrated device for monitoring deformations of an electrically insulating part for an electrical installation, said method comprising:

a step of coating an optic fiber in which at least a first Bragg grating is formed with a coating composition comprising at least one compound of the thermosetting matrix of the electrically insulating part, positioning of a part of the optic fiber in which at least a first Bragg grating is formed in a mold to form the electrically insulating part, and molding the electrically insulating part.

The coating composition is preferably essentially formed by the compounds of the thermosetting matrix of the electrically insulating part.

According to one embodiment of the method of the invention, the coating step comprises:

surface treatment,
application of an agent promoting adhesion,
dipping in the coating material, and
a baking step of said coating material.

According to one embodiment, the method comprises a step of prior coating a portion of the fiber, in which a second Bragg grating is formed, with an elastomer layer.

The prior coating step preferably comprises:

surface treatment,
application of an agent promoting adhesion,
dipping in the coating material, and
a baking step of said coating material.

The prior coating step preferably comprises initial masking of at least a portion of the optic fiber in which the first Bragg grating is formed.

BRIEF DESCRIPTION OF THE DRAWINGS

Other advantages and features will become more clearly apparent from the following description of particular embodiments of the invention given as non-restrictive examples only and represented in the accompanying drawings.

DETAILED DESCRIPTION OF AN EMBODIMENT

Figure 1:
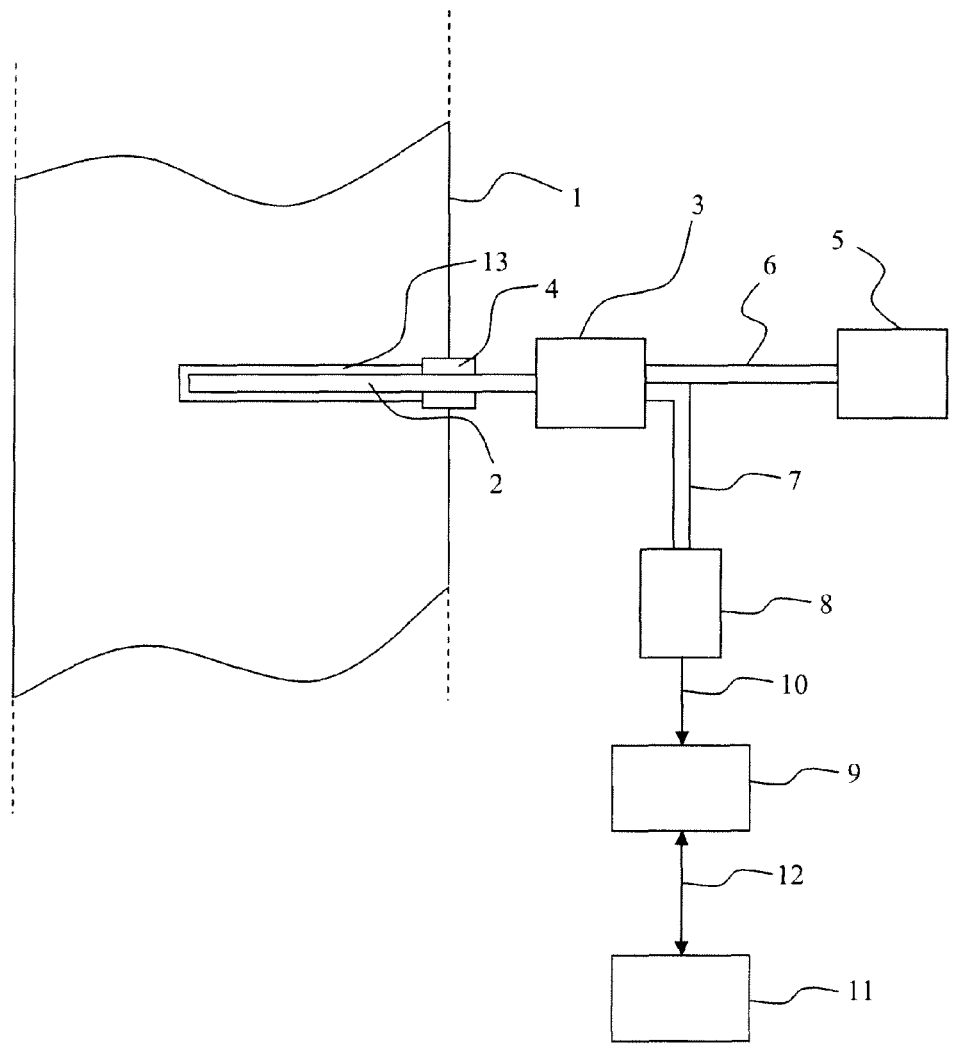
FIG. 1 represents an example of implementation of the integrated monitoring device according to the invention on the wall of an enclosure or casing for an electrical installation.

As represented in FIG. 1, the monitoring device can be integrated in an electrically insulating part such as a wall 1 of an electric casing, the latter only being partially represented. The monitoring device can be integrated in the wall of any enclosure or casing constructed from an electrically insulating material. The device integrated in the wall of the casing comprises an optic fiber 2 in which at least one Bragg grating is formed. This optic fiber is extended outside the casing up to optic coupling means 3 enabling an incident light signal to be transmitted and receiving a reflected signal generated by optical reflection of the incident light signal on the patterns of the Bragg grating. A protective seal 4 is used to protect optic fiber 2. This seal can be made from teflon. The incident light signal is generated by a light source 5, for example a tunable ultraviolet laser source with a wavelength of 140 nanometers with a resolution of 1 picometer. The light source can be any type of source known to the person skilled in the trade. The incident light signal is transmitted by optic coupling means 3 via an optic fiber connection 6 connected to said coupling means.

The reflected signal is for its part transmitted by means of an optic fiber connection 7 which is also coupled to coupling means 3. The reflected signal is sent via optic fiber connection 7 to spectrum measuring means 8 for, among other things, measuring the wavelength of the reflected signal. Measuring means 8 are connected to processing means 9 by a line 10, said processing means determining deformation data such as a deformation measurement or a preset deformation limit being exceeded.

In the embodiment represented in FIG. 1, processing means 9 are remotely connected to a central unit 11 enabling any deformation data coming not only from the device integrated in case 1, but also from other non-represented integrated devices, to be collected. Central unit 11 can be connected to processing means 9 by any communication means 12 known to the person skilled in the trade. The users of such a monitoring device can thus perform monitoring operations either punctually or continuously, on site or remotely. These monitoring operations can be performed on the whole of an installation, or even on several installations.

Figure 2:
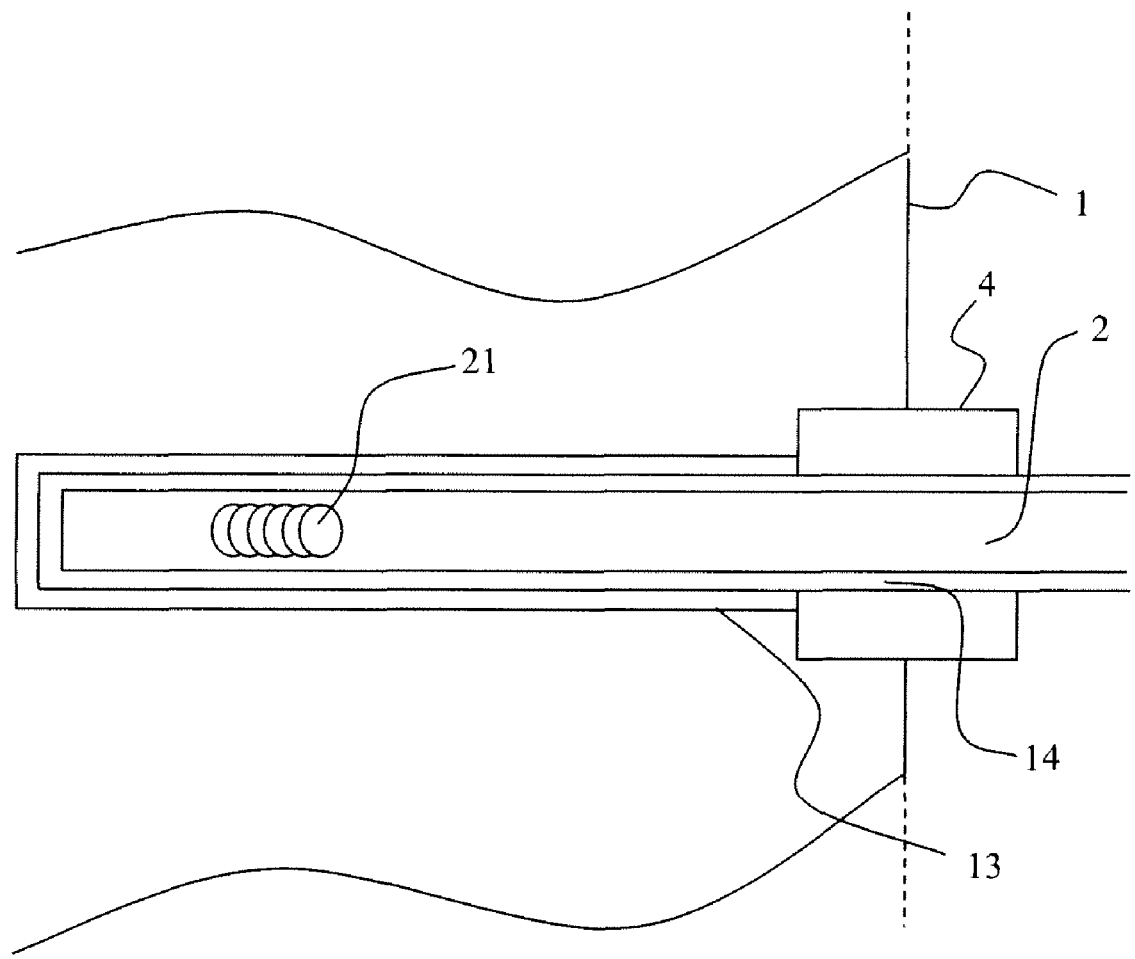
FIG. 2 represents a first embodiment of the device according to the invention comprising an optic fiber in which a Bragg grating is formed.
Figure 3:
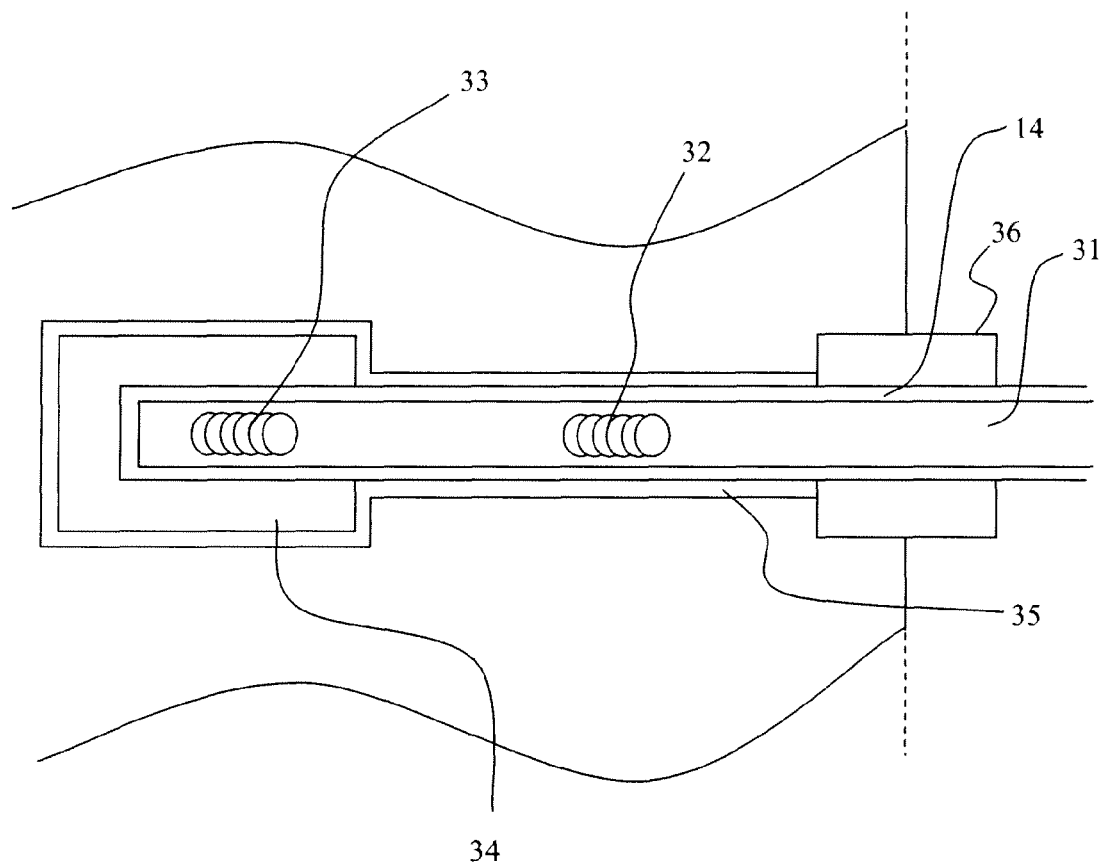
FIG. 3 represents a second embodiment of the device according to the invention comprising an optic fiber in which two Bragg gratings are formed.

According to one feature of the invention, the part of the optic fiber comprising a Bragg grating is covered by a mechanical protection sleeve 14 made from polyimide material, as represented in FIGS. 2 and 3. Generally, the mechanical protection sleeve is arranged around an optic sleeve that is not represented. The material of this mechanical protection sleeve is suitable for integration of the device in a composite material with a thermosetting matrix. The choice of a mechanical protection sleeve made from polyimide material also ensures a better temperature withstand when the electrically insulating part and the integrated monitoring device are manufactured by molding. Furthermore, such a material resists operating temperature variations for a longer time. Integrated monitoring devices are in fact optimized to have a lifetime of at least twenty-five years, a time during which the thermal fatigue effects of a polyimide sleeve are not felt. In the described embodiments, the whole of the optic fiber is covered by a mechanical protection sleeve made from polyimide material.

In the embodiments represented in FIGS. 1, 2 and 3, the optic fiber is covered by a coating 13 comprising at least one compound of the thermosetting matrix of the electrically insulating part. Coating 13 enables the adhesion and interface between on the one hand the optic fiber comprising the Bragg grating and on the other hand the material of the electrically insulating part to be completed. The coating material ensures a mechanical continuity between the fiber 2 and the material of the electrically insulating part, so that any stress exerted on said part is transmitted to the optic fiber.

The material of the electrically insulating part is a composite material, i.e. an assembly of at least one strengthener which provides the mechanical strength and a matrix. The matrix is a thermosetting resin able to contain at least one compound chosen from epoxy, polyurethanes, phenolics and unsaturated polyesters. The thermosetting matrix advantageously essentially comprises epoxy or polyurethane or an unsaturated polyester. The strengthener of the electrically insulating parts is for its part generally essentially formed by mineral particles.

The material of the electrically insulating parts in which the monitoring device is integrated generally presents a vitreous transition temperature. The coefficient of expansion thus varies significantly depending on whether the temperature is below or above the vitreous transition temperature. Under certain circumstances, the monitoring device can be used in operating conditions that are close to or identical to the vitreous transition temperature. The amplitude of the deformations can therefore be large and a good mechanical continuity therefore has to be ensured between the composite material of the electrically insulating part and the optic fiber of the integrated monitoring device.

Coating 13 can be essentially of the same composition as the thermosetting matrix of the electrically insulating part. This ensures an even better mechanical continuity between the composite material of electrically insulating part 1 and optic fiber 2 of the integrated monitoring device. Selecting a coating made from thermosetting material further ensures a good temperature withstand when the electrically insulating part and the integrated monitoring device are manufactured by molding. The thermosetting matrix of coating 13 is in fact hardened beforehand, which gives it an improved heat resistance enabling it to withstand baking when the electrically insulating part is subsequently molded enabling the monitoring device to be integrated in said part. This is all the more true as molding is accompanied by a large generation of heat caused by the exothermal reactions when the matrix hardens.

In the embodiment represented in FIG. 3, optic fiber 31 comprises a first and second Bragg grating, respectively numbered 32 and 33. The portion of the optic fiber in which the second Bragg grating 33 is formed is mechanically insulated from the electrically insulating part by means of an elastomer layer 34. Elastomer layer 34 presents a thickness generally comprised between 0.05 and 0.7 times the diameter of the optic fiber. The optic fiber and the elastomer layer, and also the first Bragg grating 32, are covered by a coating 35 comprising at least one compound of the thermosetting matrix, and which may even have a composition essentially identical to the latter. Coating 35 essentially covers the part of the fiber extending between the end incorporated in the electrically insulating part and the protective seal 36 made from teflon.

Due to elastomer layer 34, any deformation generated by mechanical stresses exerted on the electrically insulating part does not give rise to deformation of the second Bragg grating 33. As elastomer layer 34 is generally heat-conducting, any temperature variation of the electrically insulating part is accompanied by a deformation of Bragg grating 33. Bragg grating 33 thereby enables data representative of the temperature to be obtained.

As in the embodiment of FIG. 2, due to the presence of coating 35 covering the latter, the first Bragg grating 32 enables data representative of deformation by mechanical stresses exerted on the electrically insulating part to be obtained. Coating 35 generally being made from a heat-conducting material, the first Bragg grating 32 also enables data representative of the temperature of the electrically insulating part to be obtained, which data is superposed with the data representative of deformation by mechanical stresses.

The temperature effects can be separated from those of the mechanical stresses by means of suitable treatment. It is thus possible to determine both data representative of temperature by means of grating 33, and also data representative of mechanical stresses by means of both gratings. The data representative of mechanical stresses can in fact be obtained by the difference between the deformations measured by gratings 32 and 33.

Figure 4:
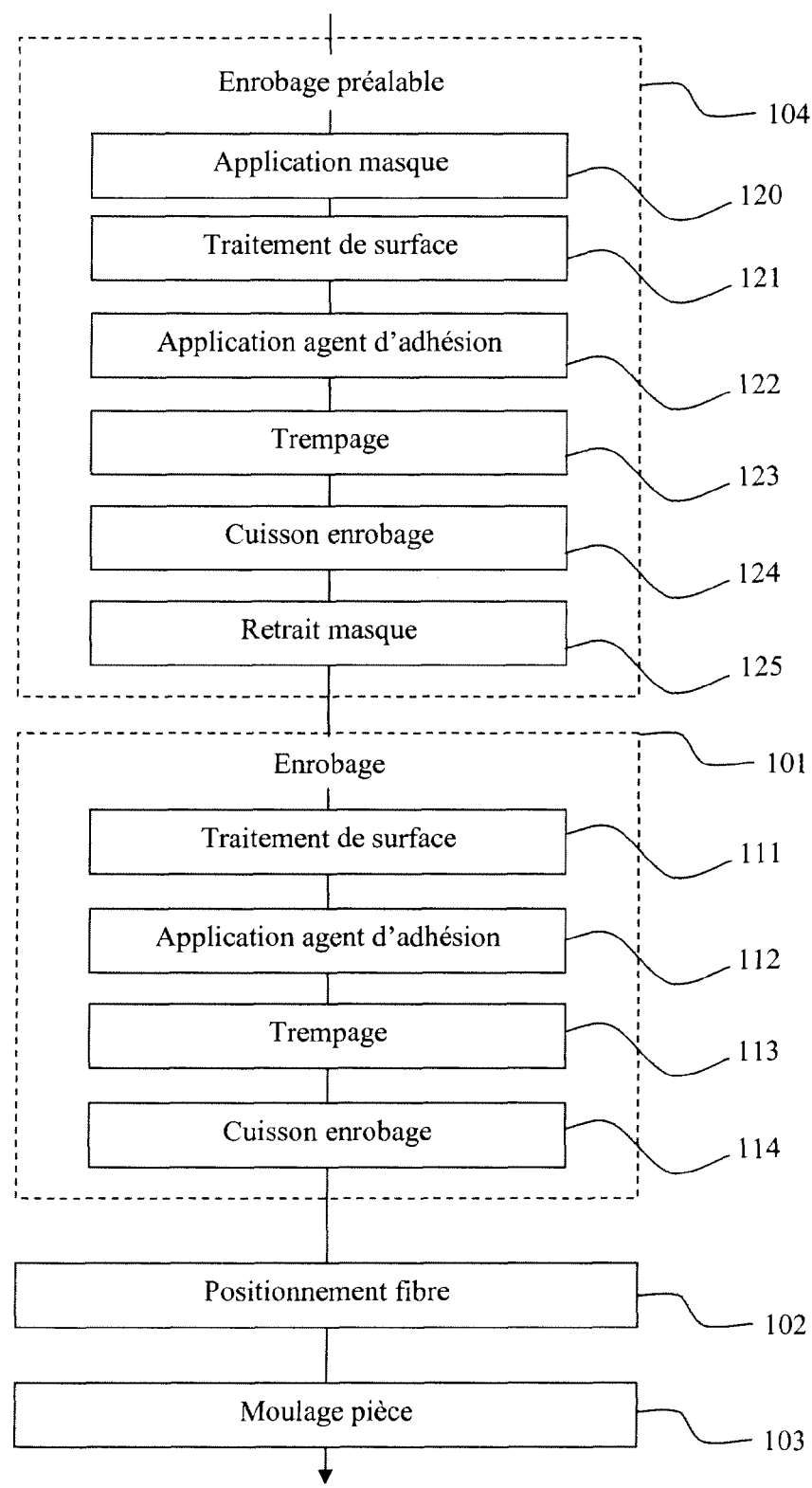
FIG. 4 represents an algorithm of the method for manufacturing an integrated monitoring device according to the present invention.

The invention also relates to a method for integrating the monitoring device described in the foregoing. As represented in FIG. 4, an embodiment of the manufacturing method of an integrated monitoring device comprises:
  a step 101 of coating the optic fiber with a coating composition comprising at least a compound of the thermosetting matrix of the electrically insulating part,
  positioning 102 a part of the coated optic fiber, in which at least a first Bragg grating is formed, in a mold to form the electrically insulating part, and
  molding 103 the electrically insulating part.

The coating step 101 essentially concerns the part of the optic fiber designed to be incorporated in the electrically insulating part, i.e. the part of the fiber extending between the end incorporated in the electrically insulating part and the teflon protective seal 4 or 36.

Molding 103 of the electrically insulating can be performed by any means known to the person skilled in the trade, such as gravitational casting.

The coating composition used in the optic fiber coating step 101 can be essentially constituted by compounds of the thermosetting matrix of the electrically insulating part.

In the embodiment represented in FIG. 4, coating step 101 comprises:
  surface treatment 111, preferably cleaning with a solvent in an ultrasonic bath,
  application of an adhesion promotion agent 112,
  dipping in the coating material 113, and
  a step of baking said coating material 114.

The adhesion promotion agent of step 112 can be a compound in liquid state containing acid-base functions or a liquid compound belonging to the organo-silane family.

The dipping step can be performed by any means known to the person skilled in the trade, such as being kept immersed in a thermostat-regulated bath with a temperature and an immersion time favorable to establishment of a continuous layer of homogeneous thickness.

The baking step can be performed by any means known to the person skilled in the trade, such as in an autoclave followed by baking in an oven.

In the case of an optic fiber comprising two Bragg gratings, the method can comprise a prior coating step 104 of a portion of the fiber, in which a second Bragg grating is formed, with a layer of elastomer. This prior coating step can comprise:
  masking 120 at least a portion of the optic fiber in which the Bragg grating is formed by means of a mask,
  surface treatment 121, preferably cleaning with a solvent in an ultrasonic bath,
  application of an agent promoting adhesion 122,
  dipping 123 in the coating material,
  a step of baking 124 said coating material, for example in an autoclave, and
  a step 125 to remove the mask.

Masking step 120 can advantageously be performed on the parts of the optic fiber extending on each side of the second Bragg grating so as to cover the part of the fiber extending between the end incorporated in the electrically insulating part and the teflon protective seal 36, with the exception of the second Bragg grating. Thus, as in the embodiment represented in FIG. 3, only the second Bragg grating 33 is covered by an elastomer layer 34.

One advantage of the monitoring device is to be able to prevent any malfunctioning that would be critical for the lastingness of one or more electrically insulating parts of an electrical installation. These malfunctions may be of thermal origin, for example when the temperature is close to the vitreous transition temperature of the thermosetting matrix. These malfunctions of thermal origin can be caused by overheating of the installation, by severe climatic conditions or by a combination of these phenomena. These malfunctions can also be generated by mechanical stresses. These malfunctions can also be caused by plasticization of the material of the electrically insulating part due to prolonged exposure to humidity. Implementation of these monitoring devices thereby increases the dependability of electrical installations.

Another advantage of the monitoring device is to enable local or remote monitoring. It is also possible to implement a plurality of monitoring devices and to perform remote monitoring by means of a centralizer.

Another advantage of the monitoring device is that is does not generate any electro-magnetic phenomenon that may have an impact on operation of the electrical components located in the vicinity.

Another advantage of the monitoring device is that it presents a lifetime of the same order of magnitude as those of the electrical installations.

Another advantage of the monitoring device is that it is of small size and that it can easily be integrated in an electrically insulating part made from a composite material with a thermosetting matrix. Furthermore, this material enables good mechanical strength, dielectric strength, and fire resistance performances, and a high level of integration to be obtained.

Another advantage of the embodiment of the monitoring device comprising two Bragg gratings is that it enables the temperature effects to be separated from those of the mechanical stresses.

The monitoring device is advantageously implemented on casings or enclosures housing electrical components under pressure of a dielectric gas or a quenching gas such as sulphur hexafluoride. It is all the more advantageous to use the monitoring device if the case or enclosure in which it is integrated comprises a burst membrane.

The monitoring device is advantageously used in medium-voltage electrical engineering applications such as circuit breakers, line disconnectors or switches.

The monitoring device can be used in other applications such as transformer insulators, wind-generator installations, and also in low-voltage or power applications, for example insulating electrical casings.

The invention claimed is:

1. An electrically insulating part for an electrical installation formed in a composite material, comprising an integrated device for monitoring deformations of said part, said device comprising an optic fiber wherein at least a first Bragg grating is formed, the electrically insulating part comprising a composite material with a thermosetting matrix, the optic fiber comprising a polyimide mechanical protection sleeve, and the optic fiber being covered by a coating comprising at least one compound of the thermosetting matrix.

2. The electrically insulating part according to claim 1, wherein the coating is essentially of the same composition as the thermosetting matrix of the electrically insulating part.

3. The electrically insulating part according to claim 1, wherein the thermosetting matrix comprises at least one compound selected from the group consisting of polyurethanes, phenolics and unsaturated polyesters.

4. The electrically insulating part according to claim 2, wherein the thermosetting matrix comprises a compound selected from the group consisting of epoxy, polyurethanes and an unsaturated polyester.

5. The electrically insulating part according to claim 1, wherein the optic fiber comprises a portion in which a second Bragg grating is formed, said portion being mechanically insulated from the electrically insulating part.

6. The electrically insulating part according to claim 5, wherein the portion of the fiber in which the second Bragg grating is formed is covered by an elastomer layer.

7. The electrically insulating part according to claim 6, wherein the elastomer layer is of a thickness between 0.05 and 0.7 times the diameter of the optic fiber.

8. An electrically insulating enclosure to accommodate electrical components, formed in an electrically insulating part, wherein said electrically insulating part is according to claim 1.

9. A method for manufacturing an electrically insulating part for an electrical installation formed in a composite material comprising an integrated device for monitoring deformations, said method comprising:
    coating an optic fiber in which at least a first Bragg grating is formed with a coating composition comprising at least one compound of the thermosetting matrix of the electrically insulating part,
    positioning a part of the optic fiber in a mold to form thefor forming an electrically insulating part, and
    molding the electrically insulating part.

10. The method according to claim 9, wherein the coating composition is essentially formed by the compounds of the thermosetting matrix of the electrically insulating part.

11. A method for manufacturing an electrically insulating part for an electrical installation formed in a composite material comprising an integrated device for monitoring deformations, said method comprising:
    coating an optic fiber wherein at least a first Bragg grating is formed with a coating composition comprising at least one thermosetting compound of the electrically insulating part, said coating comprising:
    surface treatment of a surface to be coated,
    application to said surface of an agent promoting adhesion,
    dipping the optic fiber into the coating material, and
    baking said coating material,
    positioning a part of the optic fiber in a mold for forming an electrically insulating part, and molding the electrically insulating part.

12. The method according to claim 11, comprising prior coating a portion of the fiber, in which a second Bragg grating is formed, with an elastomer layer.

13. The method according to claim 12, wherein the prior coating comprises initial masking of at least a portion of the optic fiber in which the first Bragg grating is formed.

* * * * *